United States Patent [19]

Kubiak

[11] Patent Number: 5,707,085
[45] Date of Patent: Jan. 13, 1998

[54] FLUID COUPLING

[75] Inventor: David Michael Kubiak, Saginaw, Mich.

[73] Assignee: General Motors Corporation, Detroit, Mich.

[21] Appl. No.: 713,972

[22] Filed: Sep. 12, 1996

[51] Int. Cl.⁶ ............................................. F16L 15/00
[52] U.S. Cl. .................... 285/86; 285/319; 285/321; 285/423
[58] Field of Search ........................... 285/86, 315, 321, 285/319, 423

[56] References Cited

U.S. PATENT DOCUMENTS

| | | | |
|---|---|---|---|
| 2,441,344 | 5/1948 | Bosworth | 285/321 |
| 3,812,756 | 5/1974 | Wenger | 85/8.8 |
| 4,074,912 | 2/1978 | Bilderbeek et al. | 285/86 |
| 4,332,402 | 6/1982 | Shellhause | 285/86 |
| 4,376,525 | 3/1983 | Fremy | 285/321 X |
| 4,600,221 | 7/1986 | Bimba | 285/91 |
| 4,632,434 | 12/1986 | Proctor et al. | 285/39 |
| 4,643,472 | 2/1987 | Schukei et al. | 294/94 |
| 4,645,245 | 2/1987 | Cunningham | 285/321 |
| 4,707,000 | 11/1987 | Torgardh | 285/305 |
| 4,828,297 | 5/1989 | Tarum | 285/305 |
| 5,073,071 | 12/1991 | Herwig et al. | 411/353 |
| 5,161,830 | 11/1992 | Abe | 285/319 X |
| 5,161,832 | 11/1992 | McNaughton et al. | 285/319 |
| 5,163,720 | 11/1992 | Abe | 285/319 |
| 5,342,095 | 8/1994 | Klinger et al. | 285/18 |
| 5,348,353 | 9/1994 | Deweerdt | 285/305 |

Primary Examiner—Dave W. Arola
Attorney, Agent, or Firm—Saul Schwartz

[57] ABSTRACT

A fluid coupling including a tube and a socket defined by a cylindrical counterbore in a housing. The cylindrical counterbore terminates at an annular seat and is interrupted by an annular first groove defining a first shoulder facing the annular seat and by an annular second groove defining a second shoulder facing the annular seat. The tube has an annular bead at one end which bears flush against the annular seat when the tube is plugged into the socket. A flexible retaining ring is mounted on the tube behind the bead. A plastic sleeve on the tube behind the flexible retaining ring has a cam at one end which radially expands the retaining ring to wedge the latter between the bead and the first shoulder. The retaining ring prevents dislodgment of the tube from the socket by reacting forces urging dislodgment substantially directly from the bead on the tube to the shoulder on the housing. A plurality of resilient barbs on the plastic sleeve lodge behind the second shoulder on the housing in the locking position of the sleeve to retain the sleeve in its locking position.

1 Claim, 2 Drawing Sheets

FLUID COUPLING

FIELD OF THE INVENTION

This invention relates to fluid couplings.

BACKGROUND OF THE INVENTION

Fluid couplings described as "quick connect" generally require only that a free end of a tube be plugged into a socket. A fluid coupling described in U.S. Pat. No. 4,645,245, issued Feb. 24, 1987 and assigned to the assignee of this invention, for example, includes a retaining ring in the socket which expands around the tube when the latter is plugged into the socket and which snaps into a groove in the tube for retention of the tube in the socket. A fluid coupling similar to a quick connect is described in U.S. Pat. No. 4,828,297, issued May 9, 1989 and assigned to the assignee of this invention, and includes a flexible retainer on the tube which is pushed into the socket behind a bead on the end of the tube to a position wedged between an annular shoulder of the socket and the bead. Forces urging dislodgment of the tube from the socket are reacted between the bead on the tube and the shoulder of the socket through the retainer. A fluid coupling according to this invention is a novel alternative to the fluid coupling described in the aforesaid U.S. Pat. No. 4,828,297.

SUMMARY OF THE INVENTION

This invention is a new and improved fluid coupling including a tube and a socket defined by a cylindrical counterbore in a housing. The cylindrical counterbore terminates at an annular seat and is interrupted by an annular first groove defining a first shoulder facing the annular seat and by an annular second groove defining a second shoulder facing the annular seat on the opposite side of the first shoulder from the seat. The tube has an annular bead at one end which bears flush against the annular seat when the tube is plugged into the socket. A flexible retaining ring is mounted on the tube behind the bead. A plastic sleeve on the tube behind the flexible retaining ring has a cam at one end which radially expands the retaining ring to wedge the latter between the bead and the first shoulder when the sleeve is pushed to a locking position on the tube. The retaining ring prevents dislodgment of the tube from the socket by reacting forces urging dislodgment substantially directly from the bead on the tube to the shoulder on the housing. A plurality of resilient barbs on the plastic sleeve lodge behind the second shoulder on the housing in the locking position of the sleeve to retain the sleeve in its locking position.

DESCRIPTION OF A PREFERRED EMBODIMENT

Figure 1A:
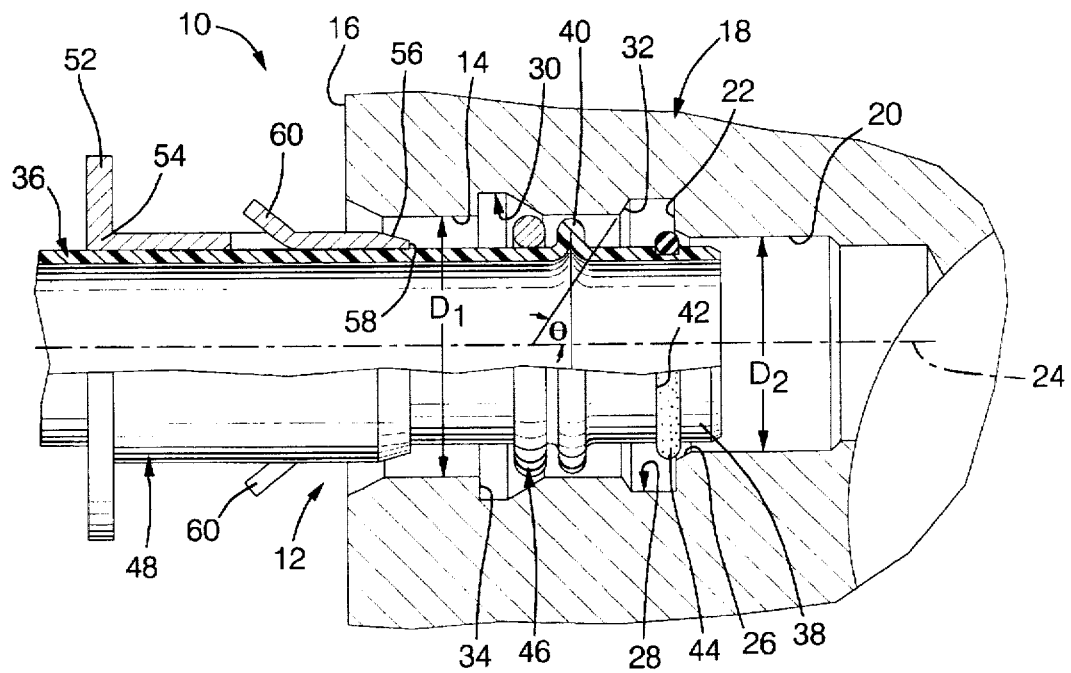
FIGS. 1A-1C are partially broken-away views of a fluid coupling according to this invention showing elements of the fluid coupling in different relative positions.

A fluid coupling 10 according to this invention includes a socket 12 consisting of a cylindrical counterbore 14 in flat side 16 of a schematically represented housing 18 around a cylindrical passage 20 in the housing. A diameter $D_1$ of the counterbore 14, FIG. 1A, exceeds a diameter $D_2$ of the passage 20. The counterbore 14 terminates at an annular seat 22 around the passage 20 in a plane perpendicular to a common longitudinal centerline 24 of the passage and the counterbore. The intersection of the annular seat 22 and the passage 20 is relieved by a chamfer 26.

The counterbore 14 is interrupted by a pair of annular grooves 28, 30 in the housing 18. The groove 28 defines an annular first shoulder 32 facing the seat 22 and flaring outward from the counterbore 14 at an angle θ, FIG. 1A, relative to the longitudinal centerline 24. The angle θ is preferably in a range of between 50° and 90°. The groove 30 defines an annular second shoulder 34 facing the seat 22 on the opposite side of the first shoulder from the seat. Preferably the plane of the second shoulder 34 is perpendicular to the longitudinal centerline 24.

A cylindrical tube 36 of the fluid coupling 10 has a distal end 38, an annular bead 40 formed by upsetting the tube, and an external annular groove 42 between the distal end 38 and the bead 40. An outside diameter $D_3$, FIG. 1B, of the tube 36 is slightly less than the diameter $D_2$ of the passage 20 in the housing 18. An outside diameter $D_4$ of the bead 40, FIG. 1B, is between the outside diameter $D_3$ of the tube and the diameter $D_1$ of the counterbore 14. When the distal end 38 of the tube 36 is plugged into the socket 12, FIGS. 1A-2A, the bead 40 clears the counterbore 14 and bears flush against the seat 22, and a seal ring 44 in the groove 42 is squeezed tightly against the passage 20 to prevent fluid leakage around the tube.

Figure 2:
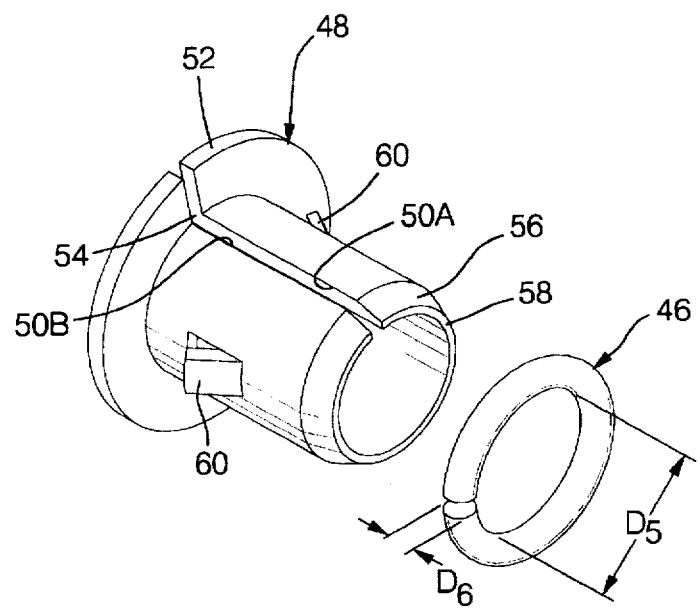
FIG. 2 is a perspective view of a plastic sleeve and a retaining ring of the fluid coupling according to this invention.

A flexible, C-shaped retaining ring 46 of the fluid coupling 10 made of high strength material, e.g., alloy steel, is disposed around the tube 36 behind the bead 40, i.e., on the opposite side of the bead from the annular seat 22. A natural or unstressed inside diameter $D_5$ of the retaining ring 46, FIG. 2, is calculated to substantially match the outside diameter $D_3$ of the tube. The round wire from which the retaining ring 46 is fabricated has a diameter $D_6$, FIG. 2, which is slightly less than the radial clearance afforded by the difference between the diameter $D_1$ of the counterbore 14 and the outside diameter $D_3$ of the tube to provide clearance for the retaining ring when the distal end of the tube is plugged into the socket 12.

A split plastic sleeve 48 of the fluid coupling 10 is disposed around the tube 36 behind the retaining ring 46, i.e., on the opposite side of the retaining ring from the annular bead 40, with a pair of longitudinal edges 50A, 50B of the sleeve separated by a gap in the sleeve. The plastic sleeve 48 has a chamfer 56 at an inboard end 58 defining a cam on the sleeve. A pair of integral flexible barbs 60 on the plastic sleeve flare outward toward the flange 52.

Figure 1B:
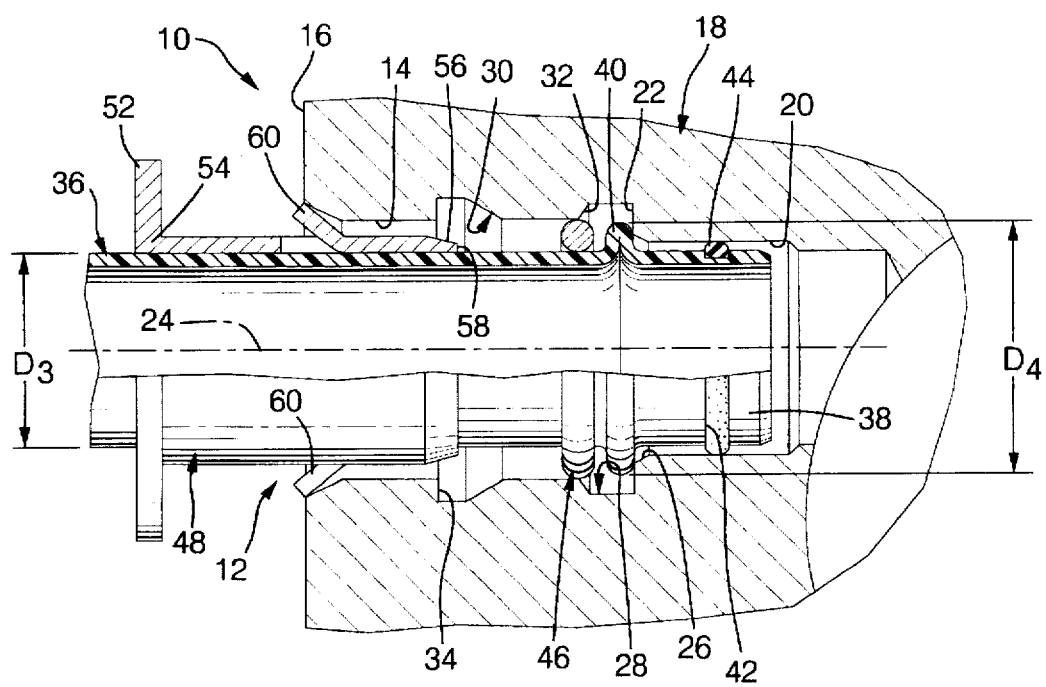
Figure 1C:
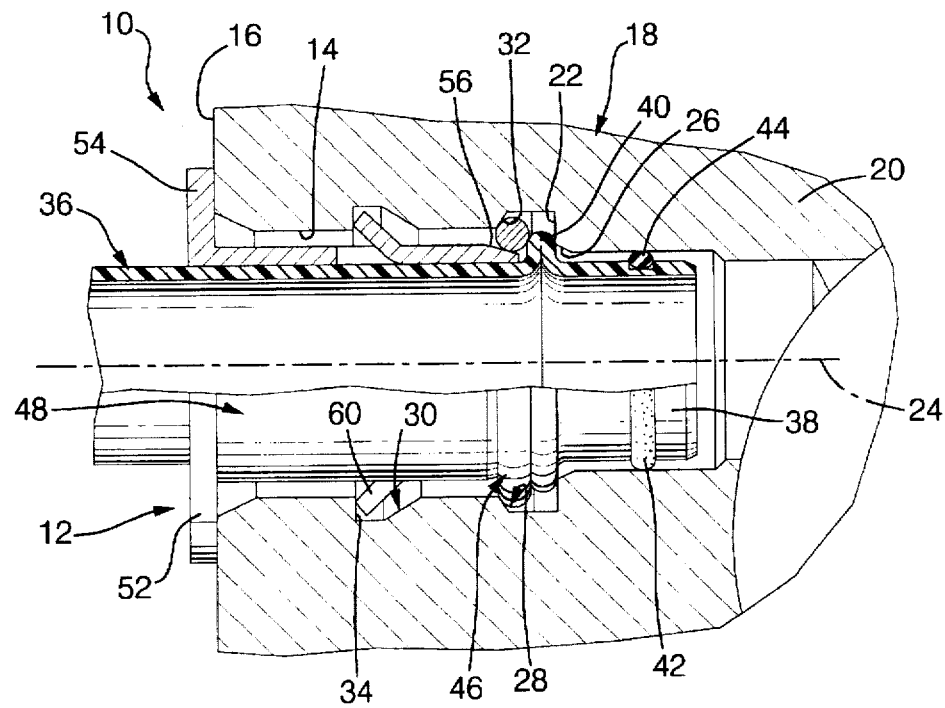

The plastic sleeve 48 has a locking position on the tube 36, FIG. 1C, when the latter is plugged into the socket 12 in which the flange 52 seats on the flat side 16 and the cam on the end of the sleeve defined by the chamfer 56 penetrates between the retaining ring 46 and the tube 36 and radially expands the retaining ring into the annular first groove 28. The span between the first shoulder 32 and the bead 40 on the tube 36 is calculated to result in the retaining ring being wedged between the shoulder 32 and the bead 40 when the plastic sleeve is in its locking position. Thus wedged, the retaining ring 46 overlaps the housing 18 and the bead 40 to prevent dislodgment of the tube 36 from the socket 12. The barbs 60 lodge behind the annular second shoulder 34 to retain the plastic sleeve 48 in its locking position.

Referring to FIGS. 1A-1C, an assembly sequence of the fluid coupling 10 according to this invention commences by plugging the distal end 38 of the tube 36 into the socket 12, FIG. 1A, with the retaining ring 46 and the plastic sleeve 48 each loose on the tube behind the bead 40 until the bead bears flush against the seat 22. The chamfer 26 on the housing 18 guides the distal end of the tube and the seal ring 44 into the passage 20, FIG. 1B. The C-shaped retaining ring 46 translates linearly with the tube in the radial clearance between the tube and the counterbore 14. With the bead 40 seated on the seat 22, the C-shaped retaining ring 46 is surrounded by the annular first groove 32.

After the bead 40 engages the seat 22, force is applied to the flange 52 on the plastic sleeve to slide the sleeve toward its locking position on the tube. Prior to the sleeve 48 attaining its locking position, the cam on the end of the sleeve defined by the chamfer 56 penetrates between the retaining ring 46 and the tube 36 and radially expands and tightly wedges the retaining ring between the first shoulder 32 and the bead 40 in the locking position of the sleeve. Concurrent with sleeve 48 attaining its locking position, the resilient barbs 60 snap radially outward into the second groove 30 and lodge behind the annular second shoulder 34. Interference between the barbs 60 and the second shoulder 34 prevents dislodgment of the plastic sleeve 48 from its locking position and, hence, dislodgment of the tube 36 from the socket 12.

Importantly, with the plastic sleeve in its locking position, forces urging dislodgment of the tube from the socket 12 are reacted substantially exclusively through the retaining ring 46. The function of the plastic sleeve 48 is only to maintain the retaining ring 46 radially expanded and wedged between the bead 40 and the first shoulder 32. The sleeve 48, therefore, is not exposed to compressive forces of substantial magnitude and may be fabricated relatively inexpensively of molded plastic.

What is claimed is:

1. A fluid coupling comprising:

a housing having a passage therein and a cylindrical counterbore around said passage terminating at an annular seat around said passage in a plane perpendicular to a common longitudinal centerline of said passage and said counterbore, an annular first groove in said cylindrical counterbore defining an annular first shoulder facing said annular seat, a cylindrical tube having a distal end in said passage in said housing, an annular bead on said tube bearing flush against said annular seat, a C-shaped retaining ring fabricated from round metal wire around said tube on the opposite side of said annular bead from said annular seat, a longitudinally split molded plastic sleeve around said tube on the opposite side of said retaining ring from said bead, a frustoconical chamfer on an end of said sleeve operative in a locking position of said sleeve on said tube to expand said retaining ring to a position wedged between said annular bead and said annular first shoulder to prevent dislodgment of said tube from said counterbore, an annular second groove in said counterbore defining an annular second shoulder on said housing facing said annular seat on the opposite side of said annular first groove from said annular seat, and a plurality of resilient barbs on said sleeve flaring outward therefrom into said annular second groove in said locking position of said sleeve on said tube and lodged against said annular second shoulder to retain said sleeve in said locking position thereof.

* * * * *